(12) United States Patent
McPhetrige (10) Patent No.: US 8,706,536 B1
(45) Date of Patent: Apr. 22, 2014

(54) SYSTEMS AND METHODS FOR ESTIMATING SAFETY STOCK LEVELS

(76) Inventor: David Alan McPhetrige, Oceanside, CA (US)

( * ) Notice: Subject to any disclaimer, the term of this patent is extended or adjusted under 35 U.S.C. 154(b) by 103 days.

(21) Appl. No.: 13/468,808

(22) Filed: May 10, 2012

Related U.S. Application Data (63) Continuation-in-part of application No. 11/971,441, filed on Jan. 9, 2008, now Pat. No. 8,315,923.

(60) Provisional application No. 60/884,065, filed on Jan. 9, 2007.

(51) Int. Cl.
*G06Q 10/00* (2012.01)

(52) U.S. Cl.
USPC .......................... 705/7.11; 705/7.12

(58) Field of Classification Search
USPC ........................... 705/7, 7.11, 7.12
See application file for complete search history.

(56) References Cited

U.S. PATENT DOCUMENTS

| | | |
|---|---|---|
| 8,209,242 B1 | 6/2012 | Henderson |
| 8,515,834 B2 | 8/2013 | Henderson et al. |
| 2002/0143669 A1 | 10/2002 | Scheer |
| 2002/0161674 A1 | 10/2002 | Scheer |
| 2003/0050870 A1 | 3/2003 | Cargille et al. |
| 2004/0153187 A1 | 8/2004 | Knight et al. |
| 2005/0075949 A1 | 4/2005 | Uhrig et al. |
| 2005/0114235 A1 | 5/2005 | Snyder et al. |
| 2005/0209732 A1 | 9/2005 | Audimoolam et al. |
| 2005/0288989 A1 | 12/2005 | Kim et al. |
| 2005/0288993 A1 | 12/2005 | Weng et al. |
| 2007/0270990 A1 | 11/2007 | Katircioglu |
| 2008/0015721 A1 | 1/2008 | Spearman |

OTHER PUBLICATIONS

Select File History from related U.S. Appl. No. 11/971,441, date Jun. 29, 2011 to May 14, 2012, 50 pages.
Notice of Allowance issued in related U.S. Appl. No. 11/971,441 dated Aug. 16, 2012, 11 pages.
Buzacott, J,A., and Shanthikurnar, JG "Safety Stock Versus Safety Time in MRP Controlled Production," Management Science 40.12 (1994): 1978-1989 ABI/Inform Global, ProQuest Web Jul. 16, 2012.
Response to Office Action in related U.S. Appl. No. 11/971,441, filed Jul. 12, 2012, 8 pages.

*Primary Examiner* — Seye Iwarere
(74) *Attorney, Agent, or Firm* — Lathrop & Gage LLP (57) ABSTRACT

A method in a computer system for estimating safety stock levels comprises the steps of receiving as inputs a target customer service level for the business, a time period, and a probability of cancellation for the item. Actual historical time-series demand data and actual historical time-series lead-time data for the item is decomposed to isolate a component attributable primarily to a random variation in a demand for the item and a random variation in a lead-time for the item, respectively. Statistical distributions are then used to generate a random demand and a random lead-time for the item for each of a plurality of time units within the time period and for each time unit within a mean lead-time. A reorder point is iterated until it yields a customer service level that is generally equal to the target customer service level, for computation of the safety stock level.

20 Claims, 5 Drawing Sheets

| Columns → | B | C | D |
|---|---|---|---|
| Rows ↓ | TIME UNIT 126 | RANDOM DAILY DEMAND 132 | RANDOM LEAD TIME 134 |
| 1 | 1 | 73 | 9 |
| 2 | 2 | 29 | 10 |
| 3 | 3 | 57 | 10 |
| 4 | 4 | 76 | 12 |
| 5 | 5 | 112 | 10 |
| 6 | 6 | 81 | 9 |
| 7 | 7 | 112 | 9 |
| 8 | 8 | 15 | 9 |
| 9 | 9 | 50 | 11 |
| 10 | 10 | 116 | 10 |
| 11 | 11 | 36 | 10 |
| 12 | 12 | 34 | 10 |
| . | . | . | . |
| . | . | . | . |
| . | . | . | . |
| 143 | 143 | 153 | 10 |
| 144 | 144 | 81 | 10 |
| 145 | 145 | 45 | 10 |
| . | . | . | . |
| . | . | . | . |
| . | . | . | . |
| 730 | 730 | 186 | 10 |

FIG. 2

| Columns → Rows ↓ | B | C | D | E | F | G | H | I | J |
|---|---|---|---|---|---|---|---|---|---|
| | TIME UNIT 126 days | RANDOM DAILY DEMAND 132 | BEG. BAL. 150 | RCPT. 152 | END BAL. 154 | ROQ 156 | OH + OO. 158 | RANDOM LEAD-TIME 134 | NUMBER OF LATE ITEMS 160 |
| 1 | 1 | 73 | 759.7 | | | | | 9 | |
| 2 | 2 | 29 | | | | | | 10 | |
| 3 | 3 | 57 | | | | | | 10 | |
| 4 | 4 | 76 | | | | | | 12 | |
| 5 | 5 | 112 | | | | | | 10 | |
| 6 | 6 | 81 | | | | | | 9 | |
| 7 | 7 | 112 | | | | | | 9 | |
| 8 | 8 | 15 | | | | | | 9 | |
| 9 | 9 | 50 | | | | | | 11 | |
| 10 | 10 | 116 | | | | | | 10 | |
| 11 | 11 | 36 | | | | | | 10 | |
| 12 | 12 | 34 | | | | | | 10 | |
| . | . | . | | | | | | . | |
| . | . | . | | | | | | . | |
| . | . | . | | | | | | . | |
| 143 | 143 | 153 | | | | | | 10 | |
| 144 | 144 | 81 | | | | | | 10 | |
| 145 | 145 | 45 | | | | | | 10 | |
| . | . | . | | | | | | . | |
| . | . | . | | | | | | . | |
| . | . | . | | | | | | . | |
| 730 | 730 | 186 | | | | | | 10 | |

Optimal Safety Stock Level 102 for item 128 is: _________

FIG. 3

| Columns → Rows ↓ | B | C | D | E | F | G | H | I | J |
|---|---|---|---|---|---|---|---|---|---|
| | TIME UNIT 126 days | RANDOM DAILY DEMAND 132 | BEG. BAL. 150 | RCPT. 152 | END BAL. 154 | ROQ 156 | OH + OO. 158 | RANDOM LEAD-TIME 134 | NUMBER OF LATE ITEMS 160 |
| 1 | 1 | 73 | 759.7 | 0 | 686.7 | 84 | 770.7 | 9 | 0 |
| 2 | 2 | 29 | 686.7 | 0 | 657.7 | 24 | 765.7 | 10 | 0 |
| 3 | 3 | 57 | 657.7 | 0 | 600.7 | 60 | 768.7 | 10 | 0 |
| 4 | 4 | 76 | 600.7 | 0 | 524.7 | 72 | 764.7 | 12 | 0 |
| 5 | 5 | 112 | 524.7 | 0 | 412.7 | 108 | 760.7 | 10 | 0 |
| 6 | 6 | 81 | 412.7 | 0 | 331.7 | 84 | 763.7 | 9 | 0 |
| 7 | 7 | 112 | 331.7 | 0 | 219.7 | 108 | 759.7 | 9 | 0 |
| 8 | 8 | 15 | 219.7 | 0 | 204.7 | 24 | 768.7 | 9 | 0 |
| 9 | 9 | 50 | 204.7 | 0 | 154.7 | 48 | 766.7 | 11 | 0 |
| 10 | 10 | 116 | 154.7 | 84 | 122.7 | 120 | 770.7 | 10 | 0 |
| 11 | 11 | 36 | 122.7 | 0 | 86.7 | 36 | 770.7 | 10 | 0 |
| 12 | 12 | 34 | 86.7 | 24 | 76.7 | 24 | 760.7 | 10 | 0 |
| . | . | . | . | . | . | . | . | . | . |
| . | . | . | . | . | . | . | . | . | . |
| . | . | . | . | . | . | . | . | . | . |
| 143 | 143 | 153 | 221.7 | 12 | 80.7 | 216 | 764.7 | 10 | 0 |
| 144 | 144 | 81 | 80.7 | 0 | -0.3 | 84 | 671.7 | 10 | -0.3 |
| 145 | 145 | 45 | -0.3 | 132 | 76.7 | 144 | 878.7 | 10 | 0 |
| . | . | . | . | . | . | . | . | . | . |
| . | . | . | . | . | . | . | . | . | . |
| . | . | . | . | . | . | . | . | . | . |
| 730 | 730 | 186 | 94.7 | 0 | -91.3 | 204 | 700.7 | 10 | -91.3 |

Optimal Safety Stock Level 102 for item 128 is: _________

FIG. 4

SYSTEMS AND METHODS FOR ESTIMATING SAFETY STOCK LEVELS

CROSS-REFERENCE TO RELATED APPLICATIONS

This application is a continuation-in-part of U.S. patent application Ser. No. 11/971,441, filed Jan. 9, 2008 now U.S. Pat. No. 8,315,923 which claims priority to U.S. Provisional Patent Application No. 60/884,065, filed Jan. 9, 2007. The entire disclosure of each is incorporated herein by reference.

BACKGROUND

The present invention generally relates to systems and methods for estimating safety stock levels. Safety stock is a level of extra stock that a business maintains to alleviate the risk of stockouts due to uncertainties in supply and demand.

SUMMARY

Systems and methods for estimating safety stock levels of an item are disclosed. According to one embodiment, a method in a computer system for estimating a safety stock level of an item to be maintained by a business during a time period comprises the steps of receiving as an input a target customer service level of the business, the time period, a probability of cancellation for the item, actual historical time-series demand data for the item, actual historical time-series lead-time data for the item, and a minimum order quantity. The actual historical time-series demand data for the item is decomposed to isolate a component attributable at least predominantly to a random variation in a demand for the item. An array of statistical distributions is then used to generate a random demand for each of a plurality of time units within the time period and for each time unit within a mean lead-time for the item. The actual historical time-series lead-time data is also decomposed to isolate a component attributable at least predominantly to a random variation in a lead-time for the item. The array of statistical distributions is then used to generate a random lead-time for the item for each of the plurality of time units within the time period and for each time unit with the mean lead-time for the item. A first value for a reorder point is estimated to compute a first calculated service level. The reorder point reflects the beginning balance for the item on a first time unit. A second value for the reorder point is estimated to compute a second calculated service level, and a third value for the reorder point is estimated to compute a third calculated service level. The difference between the target service level and the third calculated service level is less than a difference between the target service level and the first calculated service level. The difference between the target service level and the third calculated service level is also less than a difference between the target service level and the second calculated service level.

According to another embodiment, a software product comprising instructions is stored on computer-readable media. The instructions, when executed by a computer, perform steps to determine safety stock levels to be maintained by a business during a time period. The steps comprise receiving as inputs a target customer service level for the business, the time period, and a probability of cancellation for the item. Actual historical time-series demand data for the item is decomposed to isolate a component attributable primarily to a random variation in a demand for the item. At least one distribution in an array of statistical distributions is used to generate a random demand for the item for each of a plurality of time units within the time period and for each time unit within a mean lead-time for the item. Actual historical lead-time data for the item is also decomposed to isolate a component attributable primarily to a random variation in a lead-time for the item. At least one distribution in an array of statistical distributions is used to generate a random lead-time for the item for each of the plurality of time units within the time period and for each time unit within the mean lead-time for the item. A first value of a reorder point is estimated to compute a first calculated service level. The reorder point reflects a beginning balance of the item on a first time unit. A second value for the reorder point is estimated to compute a second calculated service level. A difference between the target service level and the second calculated service level is less than a difference between the target service level and the first calculated service level. The array of statistical distributions comprises a Poisson distribution, a gamma distribution, a binomial distribution, a gamma-Poisson distribution, and a binomial gamma distribution.

According to yet another embodiment, a system for determining safety stock levels comprises at least one processor and a computer memory coupled to the processor. The memory has recorded within in machine readable instructions for receiving as an input a target customer service level of the business, the time period, a probability of cancellation for the item, actual historical time-series demand data for the item, actual historical time-series lead-time data for the item, and a target probability of demand fulfillment without expediting. The actual historical time-series demand data for the item is decomposed to isolate a component attributable at least predominantly to a random variation in a demand for the item. At least one of a plurality of statistical distributions is used to generate a random demand for the item for each of a plurality of time units within the time period and for each time unit within a mean lead-time for the item. The actual historical time-series lead-time data for the item is also decomposed to isolate a component attributable at least predominantly to a random variation in a lead-time for the item. At least one of a plurality of statistical distributions is used to generate a random lead-time for the item for each of the plurality of time units within the time period and for each time unit within the mean lead-time for the item. A value of a reorder point is iterated until it yields a calculated service level that is generally equal to the target customer service level. The reorder point reflects a beginning balance of the item on a first time unit. The plurality of statistical distributions comprise a Poisson distribution, a gamma distribution, a binomial distribution, a binomial gamma distribution, a gamma Poisson distribution, and a normal distribution. The statistical distribution used to generate the random demand for each of the plurality of time units is different from the statistical distribution used to generate the random lead-time for each of the plurality of time units.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Embodiments of the present invention provide systems and methods for estimating safety stock levels. Safety stock (also known as buffer stock) is a level of extra stock that a business maintains to mitigate the risk of stockouts (e.g., shortfall in raw material or packaging) due to uncertainties in supply and demand.

A business may include safety stock in its inventory for several reasons. For example, a business may include safety stock in its inventory when its customers expect their orders to be filled in an amount of time that is less than the replenishment or acquisition time of the business. Or, a business may include safety stock in its inventory where the business cannot reliably predict the timing and/or magnitude of all variations in its customers' demand, and/or all variations in an item's replenishment or acquisition time. Alternatively, or in addition, a business may include safety stock in its inventory to ensure that its service level consistently meets a set target (e.g., 90%).

Generally speaking, there is no mean demand for safety stock. This is because the timing of random demand and lead-time variations of items are unknown, and because the overall mean demand and/or mean lead-time may be unaffected by the random variations. Thus, to maintain a desired service level, a business must retain safety stock at all times to account for the unpredictable timing of random variations in demand and lead-times. Indeed, it is not uncommon for large production businesses to have in their inventory tens of thousands of items as safety stock. However, each item's safety stock level may have an adverse effect on two opposing business goals: service level (which is a target customer satisfaction level, as explained in more detail below), and return on inventory investment. Specifically, the service level may suffer where a sufficient safety stock for a particular item is not maintained, whereas the return on inventory investment may suffer where there the safety stock level is excessive. Optimal safety stock is the safety stock that strikes a balance between these two competing goals, i.e., just enough "extra" of each item to achieve the desired service level, but no more.

It may be possible for a business to expedite certain items to, for example, respond to an increased demand for the items. However, expediting may adversely, and significantly, affect the return on a business' inventory because of its increased cost. Optimal safety stock can thus alternatively be defined as the safety stock level that provides, reliably and consistently, a desired level of customer service, notwithstanding random variations in replenishment lead-time and customer demand, with minimal expediting and minimal on-hand inventory, for any given business time period.

As can be appreciated, a safety stock analysis based on the aforementioned definition of optimal safety stock level may include five basic outputs: (1) a safety stock level, which can be expressed as a quantity of inventory units (e.g., 10 items) and/or a time period (e.g., a safety day or safety week); (2) a target customer service level, which represents a target goal (e.g., a target goal that the demand of at least 90% of the business' customers be timely met); (3) inventory performance, including the inventory designated as safety stock (e.g., the inventory turnover ratio or the monetary value of on-hand inventory); (4) expediting events and their related costs (e.g., airfreight costs per year to expedite shipping of an item, or the cost to ship an item from a secondary source); and (5) a time period (e.g., a day, month, quarter, or fiscal or calendar year). As can further be appreciated, a safety stock analysis based on this definition may also include two fundamental inputs: (1) random lead-time variation; and (2) random demand variation.

Businesses typically have strategic and financial targets for each of the five outputs referenced above, and optimal safety stock levels may assist businesses in achieving these targets. Each of these five outputs may be expressed numerically. The two input variables may likewise be represented statistically with numerical values. A cause and effect relationship exists between the two inputs and five outputs, which indicates that a model may be established to quantify the optimal safety stock level that provides the five outputs, given the structure of the two input variables. However, optimal safety stock levels may be significantly affected by nuances within the indicated inputs and outputs, as well as by factors beyond them. For example, optimal safety stock levels may be affected by the structure of the demand and its random variation, and/or the structure of the lead-time and its random variation. Similarly, the probability that unfulfilled demand will be cancelled as opposed to becoming back-logged (i.e., whether a customer will accept late delivery of the item or cancel the order because it is late) may also affect optimal safety stock levels. Interplay of other considerations, such as the target probability of the demand being fulfilled without expediting, the time period used for estimating the safety stock level, or the reorder quantity (e.g., whether a business must buy at least twelve of a given item at a time, even if it needs only one item) may also affect optimal safety stock levels.

Figure 1A:
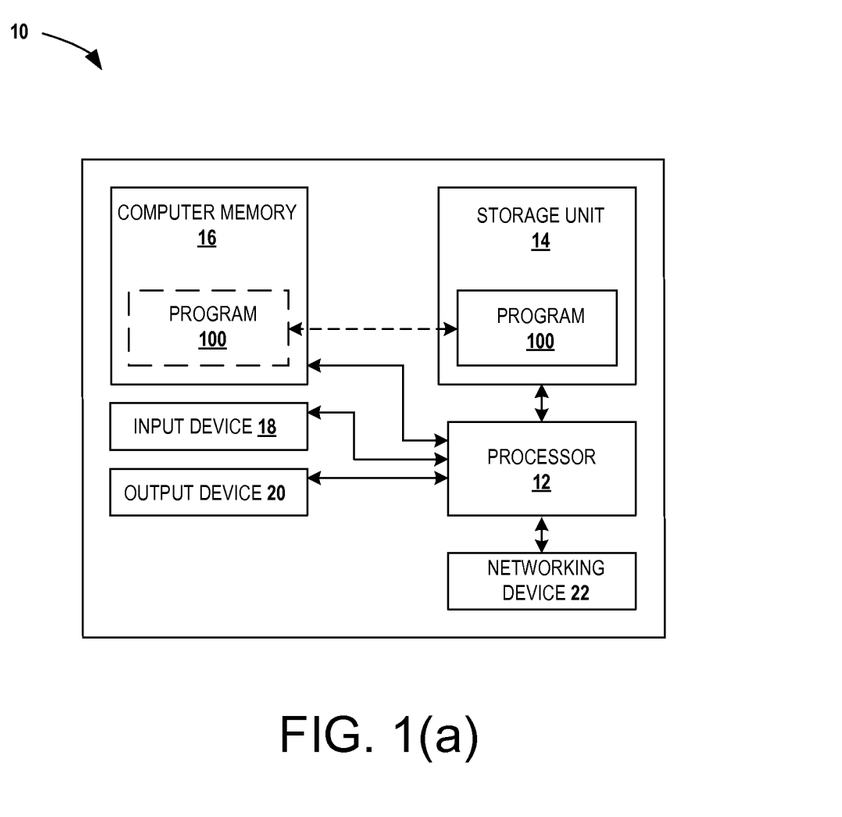
FIG. 1(a) shows an exemplary system for estimating safety stock levels, according to one embodiment.

Keeping these and other relevant considerations in mind, the present invention discloses a system (10) for simulating a safety stock level that achieves a particular business' target customer service level and inventory performance, with a specified level of confidence that the target customer service level may be achieved without expediting. As shown in FIG. 1(a), the system (10) may have a processor (12) in data communication with a storage unit (14), a computer memory (16), an input device (18), and an output device (20). The system (10) may, but need not, also include a networking device (22). The storage unit (14) may be, for example, a non-transitory disk drive that stores programs and data, and the storage unit (14) is illustratively shown storing a program or workflow instructions (100) embodying steps and methods disclosed herein.

It should be understood that the program (100) could be broken into subprograms and stored in multiple storage units of one or more computers and that data could be transferred between those storage units using methods known in the art. A dashed outline within the computer memory (16) represents the software program (100) loaded into the computer memory (16) and executed by the processor (12), and a dashed line between the storage unit (14) and the computer memory (16) illustrates the transfer of the program (100) between the storage unit (14) and the computer memory (16). The input device (18) may be any desirable input device(s), such as a keyboard, a touch screen, a scanner, a mouse, a compact disc reader, et cetera, and the output device (20) may be any desirable output device(s), such as a display, an audible output device, a printer, et cetera.

The system (10), by implementing the program (100), produces a probabilistic range of outcomes that specify the probability of a particular safety stock level (102) achieving a business' target customer service level (104) in a given time period, without a need for expediting. The program (100) may use one or more of the following inputs, which may be inputted by using the input device (18).

Inputs

1. Target Customer Service Level (104):

The target customer service level (104) is the desired customer service goal of a business (e.g., a target service level of 97% may indicate that the business desires for the demand of 97% of its customers to be timely met). Businesses may measure their actual customer service level performance in various ways, and as such, the target customer service level (104) may be expressed in the program (100) in various ways; for example, the target customer service level (104) may represent a quantity-based fill rate, such as:

a) 1−[(number of units that are late)/(number of total units demanded)];
   b) 1−[(number of order lines that are late)/(number of total order lines)]; or
   c) 1−[(number of orders not on time and in full)/(number of total order)].

Or the target customer service level (104) may represent a time-and-quantity-based fill rate, such as:

$$1-[(\text{unit-days late})/(\text{total demand})].$$

Other ways of expressing this target customer level (104) in the program (100) are also possible. For example, the target customer service level (104) may be based on an event-based probability of no stockouts during lead-times or order cycles. Generally, as the target customer service level (104) increases, more safety stock (102) is required to meet the increased target 104.

2. Random Demand Variation (108):

The random demand variation (108) may be based on actual historical time-series demand data (110) for an item (e.g., data outlining how many items were demanded each day by customers of the business during the previous five years). But, data from the actual historical time-series demand (110) of the business may reflect, in addition to random variations in demand (108), other variations that should preferably be excluded from estimations of optimal safety stock levels (102). For example, the actual historical time-series demand data (110) may reflect variations based on seasonality (e.g., where the demand for an item is higher during summer than in winter). As seasonality has a predictable timing, it should be excluded from safety stock level estimations to prevent "doubling up" on inventory, by including such seasonal fluctuations in both forecasts and safety stock levels (102). Similarly, the actual historical time-series demand data (110) may reflect variations based on trends (e.g., where demand for an item steadily increases by a certain percentage each month). Trends, like seasonality, also have a timing that is generally predictable, and should be excluded from estimations of optimal safety stock levels (102).

The time-series demand data (110) may also reflect variations due to certain predictable special causes. For example, demand for an item may increase when that item is being promoted via a special offer. Such predictable special causes, like seasonality and trends, should also be excluded from approximations of the optimal safety stock level (102). The time-series demand data (110) may similarly include variations due to rare unpredictable special causes. For example, an earthquake may have increased or decreased the actual demand for an item for a period of time. Such unpredictable special causes should also be excluded from safety stock levels (102) because of their infrequency. Other such variations that should be excluded from the optimal safety stock level (102) include common but unpredictable special causes, for example, a transaction error (e.g., where a typographical error causes the demand for an item to be reflected as 1,000 per day instead of 100 per day). Such variations caused by typical unpredictable causes need to be excluded from safety stock levels (102) estimations because they are not representative of the common cause system.

The system (10), via the program (100), may first decompose the actual time-series demand data (110), which may include several different types of variations as discussed above, to isolate the component attributable solely (or at least predominantly) to random variations in demand (i.e., the random demand variation (108)). The program (100) may then use an array of statistical distributions and goodness-of-fit statistical techniques to estimate the best fit for the shape and scale of the random demand variations (108). For example, the program (100) may use a gamma distribution, a binomial distribution, a binomial gamma distribution, a Poisson distribution, a gamma-Poisson distribution, a normal distribution, as well as other families of parametric distributions. Techniques such as statistical bootstrapping may also be used. Popular safety stock estimation techniques generally utilize only the normal distribution; the present invention is not so confined, however, based on the realization that real world demand is rarely normally distributed. It will be appreciated by those skilled in the art that for statistical reliability, the actual time-series demand data (110) for the business should include a sufficiently large number of data points (e.g., a hundred or more), and that the time-series demand data (110) should preferably be based on sufficiently small time units (e.g., daily) for adequate resolution. Where the actual historical time-series demand data (110) of the business is unavailable, an estimate of the shape and scale of the random demand variation (108) may be used in the program (100). Generally, as random demand variation (108) increases, more safety stock (102) is required to meet the target customer service level (104).

3. Random Lead-Time Variation (112):

The random lead-time variation (112) may be based on an actual historical time-series lead-time data (114) of the business (e.g., data outlining the number of days it took for an order to reach the business after placement of the order, for the past two years). The actual historical time-series lead-time data (114) may reflect variations other than the random lead-time variation (112) (as discussed with respect to the random demand variation (108), for example) that should preferably be excluded from estimations of the optimal safety stock level (102). Thus, the actual historical lead-time data (114) may be decomposed to isolate the random lead-time variation (112) component, and the shape and scale of the random lead-time variation (112) may be estimated by using appropriate goodness-of-fit statistical techniques. Where the actual lead-time variation data (112) of the business is unavailable, the shape and scale of the random lead-time variation data (112) may be estimated for use in the program (100). Generally, as random lead-time variation (112) increases, more safety stock (102) is required to meet the target customer service level (104).

4. Replenishment Interval (116):

The replenishment interval (116) may be obtained from the minimum order quantity, or other reorder quantity such as an economic order quantity, a run size, a batch size, a package size, et cetera. For example, a supplier for the business may require that the business purchase, at once, at least a dozen of a given item, even where the business needs only one of that item. Or the supplier may only sell the item in a package that contains twelve items. Thus, the business may be forced to purchase, for example, 24 items, even though the business requires only 19 items. Replenishment interval (116), then, is the combination of reorder quantity, including package multiples, divided by mean periodic demand. It represents the average amount of time required for average demand to consume the reorder quantity, and thus the average time interval in between replenishments. In some cases, replenishment interval may represent the reorder review interval. The program (100) accounts for this fact in its safety stock level (102) estimations. Generally, as replenishment interval (116) increases beyond mean lead-time, or decreases below mean lead-time (though generally for a different reason than when replenishment interval (116) increases beyond lead-time), less incremental safety stock (102) is required.

5. Customer-Service-Level Measurement Type (118):

As discussed above with respect to INPUT 1 (target customer service level (104)), there are several different ways of expressing the actual customer service level (104) of the business. The program (100) allows the business to specify the customer-service-level measurement type (118), to ensure that the target customer service level (104) is treated appropriately by the program (100).

6. Probability of Cancellation (120):

Certain items may be sold or otherwise offered by a variety of businesses, whereas other unique items may only be sold by the business. Where the business sells an item that is also sold by other businesses, a customer of the business may be more likely to cancel an order that it placed for that item, when the business is unable to fill that order in the allotted time (because the customer can presumably purchase that item from other businesses). Conversely, where the customer's order relates to an item that is sold solely (or predominantly) by the business, the customer may be more likely to not cancel the order, even when the business is unable to timely fill the customer's order. This probability of cancellation (120), as opposed to the probability that the item will become past-due backlog, may be based on the actual historical data of the business, or where such data is unavailable, the probability of cancellation (120) may be estimated. It will be appreciated that this probability of cancellation (120) may be affected by factors other than the uniqueness of items; for example, a customer who has had a longstanding relationship with a business may be less likely to cancel a late order from that business even where that item is available elsewhere. Similarly, price of the items, their quality, brand name recognition, et cetera, may also affect this probability of cancellation (120). In any case, past-due backlog typically disrupts the fulfillment of other demand, causing even more past-due backlog and customer service level failures. Thus, generally, as the probability of cancellation (120) increases, the required safety stock (102) decreases.

7. Target Probability of Demand Fulfillment without Expediting (122):

The target probability of demand fulfillment without expediting (122) is a goal of the business; specifically, this target probability (122) reflects the confidence with which the business is assured that it will be able to meet its target customer service level (104), without the need for expediting any item. For example, some items may be expedited quickly, easily and inexpensively; these items may require a lower target probability of demand fulfillment without expediting (122) than other items which are difficult and costly to expedite. Generally, as the target probability of demand fulfillment without expediting (122) increases, more safety stock (102) is required to maintain the target customer service level (104).

8. Time period (124): The time period (124) is that period for which the program (100) measures the actual customer service levels, inventory performance and expediting probability for comparison to their targets. The time period (124) may be expressed as a sum of individual time units (126). For example, a time period (124) may be a business quarter, which may comprise 65 time units (126) (i.e., 5 business days per week multiplied by 13 weeks per quarter).

Figure 1B:
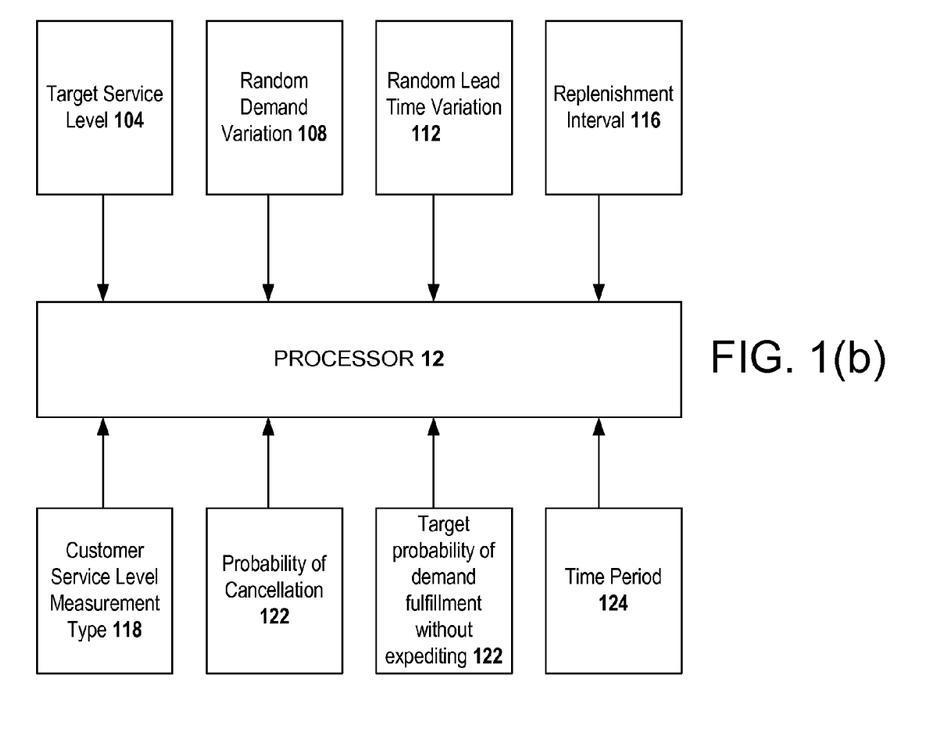
FIGS. 1(b) and 1(c) show certain inputs being fed to a processor of the system of FIG. 1(a)
Figure 1C:
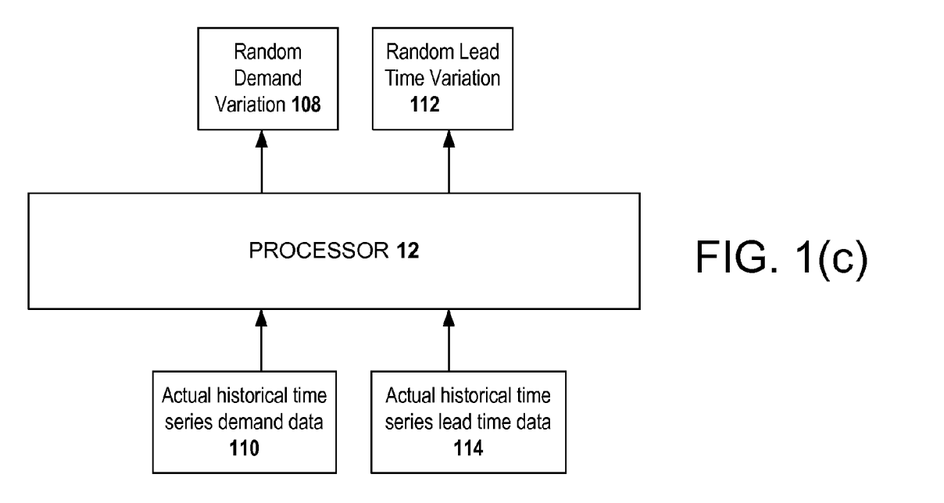

As shown in FIG. 1 (b), one or more of these inputs may be fed to the processor (12) for analysis by the system (10) and the program (100). Further, as can be appreciated from FIG. 1(b) and FIG. 1(c), two inputs, i.e., the random demand variation (108) and the random lead time variation (112), may be generated and fed back to the processor (12) after the processor (12) respectively evaluates the actual historical time-series demand data (110) for the item (128) and the actual historical time-series lead-time data (114) for the item (128) (as discussed above).

Operation

The system (10), via the program (100), then simulates the random demand variation (108), the random lead-time variation (112), the replenishment interval (116), and the probability of cancellation (120) to quantify an optimal safety stock level (102) required to achieve the desired target customer service level (104) of the business at the target probability of demand fulfillment without expediting (122). In cases where the demand or lead-time series involve a systematic component, such as seasonality, trending, anticipated sales promotions, etc., and this or these cannot be accommodated in a forecast, the simulated demand or lead-time series may involve components that model and/or adjust for this systematic variation. As will become clear, the program (100) provides a range of possible outcomes for the business, which range of outcomes can be used by the business for a variety of purposes, such as risk assessment, best case scenario assessment, worst case scenario assessment, et cetera.

Consider, for example, that the business wishes to determine the optimal safety stock level (102) that it should maintain for an item (128) during the next two years. The business is generally open for business seven days a week, but is closed on five federal holidays a year. This yields a time period (124) comprising 720 time units (126) (i.e. 365*2−(5*2)). The item (128) is unique, and as such, the customers of the business never cancel late orders (i.e., the probability of cancellation (120) is 0). The replenishment interval (116) of the item (128) is determined by its package size, which package, in this example, contains a dozen items (128) (i.e., the business must purchase at one time at least 12 items (128), and if the business wishes to purchase more than 12 items (128), the number of items (128) purchased by the business must be a multiple of 12). A mean lead-time of the item (128), which may be quantified by using the actual historical time-series lead-time data (114), is 10 time units (126). Had the actual historical time-series lead-time data (114) for the item (128) been unavailable, this mean lead-time could have been estimated by using a current lead-time of the item (128). The business utilizes a quantity-based fill rate type of customer service level measurement (118), and desires to maintain a safety stock level (102) that would allow it to timely fill at least 90% of its customer's orders during the 2 year time period (124). This business measures its actual customer service level (118) by using the following formula:

Customer Service Level (118)={1−[Σ quantity of late items in time period/Σ daily demands in time period]}*100.

The business, also has target probability of demand fulfillment without expediting (122) of 90%; that is, 90% confidence of achieving this customer-service level without expediting. All these input values for the business are entered in the program (100).

The program (100) begins by statistically estimating the random demand variation (108). Specifically, the program (100) decomposes the actual historical time-series demand data for the item (128) to isolate the random demand variation component (108) therefrom, and then, by the shape and scale of this demand variation (108) as gleaned from goodness-of-fit statistical techniques, generates a daily random demand value (132). This daily random demand value (132) may be generated for each time unit (126) within the time period (124), as well as for each time unit (126) comprising the mean lead-time. People of skill in the art will appreciate that various software platforms can be used for these statistical computations and goodness-of-fit analyses, such as statistical analysis software designed by JMP® of Cary, N.C.

Figure 2:
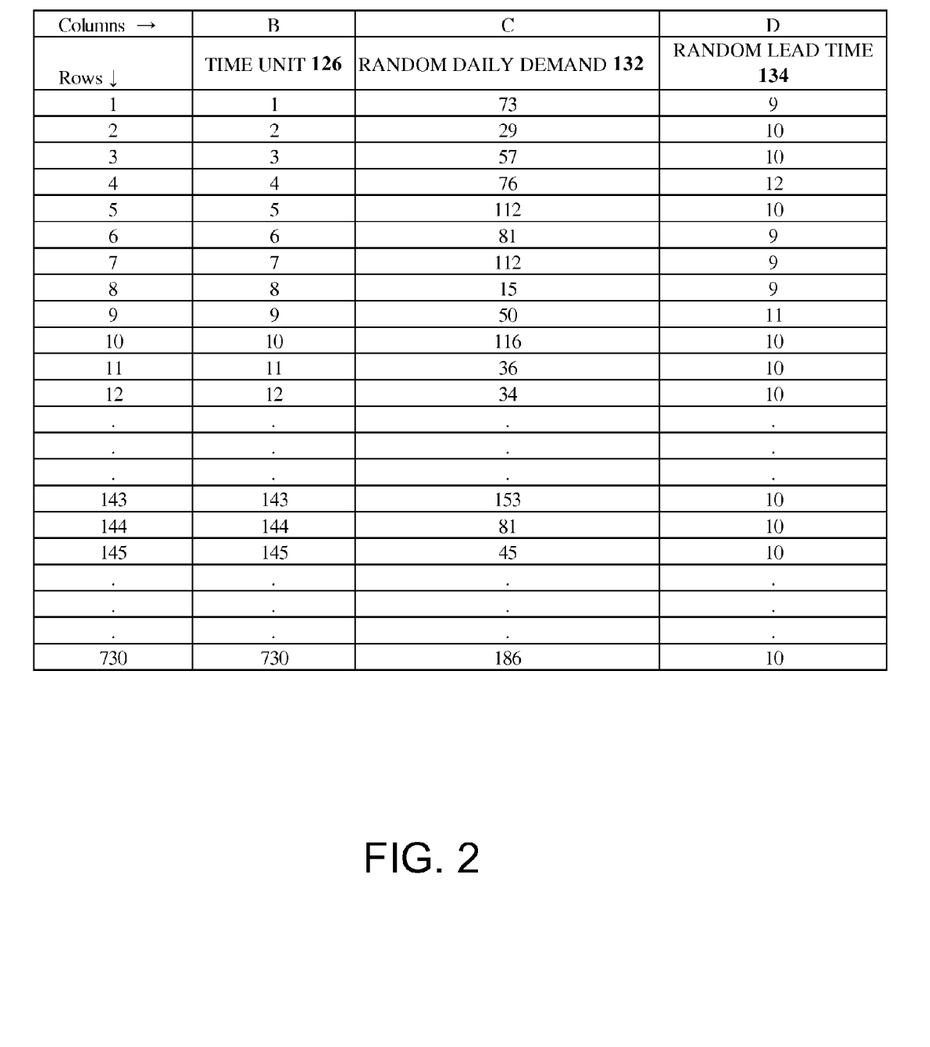
FIG. 2 shows an exemplary spreadsheet outlining some values that are generated by the system of FIG. 1(a) to estimate safety stock levels.

FIG. 2 shows a spreadsheet outlining these statistically obtained, random daily demand values (132); as evident from FIG. 2, these daily demand values (132) are generated for each of the 720 time units (126) within the time period (124), and for the mean lead-time of 10 time units (126) (i.e., for a total of 730 time units). To facilitate discussion of the system (10) and the program (100), it may be helpful to identify certain discrete cells of the spreadsheets shown in the Figures; these cells will be referred to herein by their column and row numbers. For example, cell C12 (having a value of 34) represents the random demand of the item (128) on the twelfth time unit (126). While not required, the random demand values (132) may be adjusted to reflect anticipated changes, such as increases or decreases in demand due to trending or seasonality.

The program (100) similarly generates a random lead-time (134) for each order. Specifically, the program (100) decomposes the actual historical time-series lead-time data (114) of the item (128) and isolates the component attributable primarily to the random lead-time variation (112). Then, by the shape and scale of this lead-time variation (112) as approximated by goodness-of-fit statistical techniques, the program (100) generates a random lead-time (134) for each of the 730 time units (126). These random lead-times (134) are shown in FIG. 2 in Column D. For example, cell D8, which has a value of 9 time units (126), indicates that an order made by the business on the 8th time unit (124) will arrive at the business after 9 days.

Figure 3:
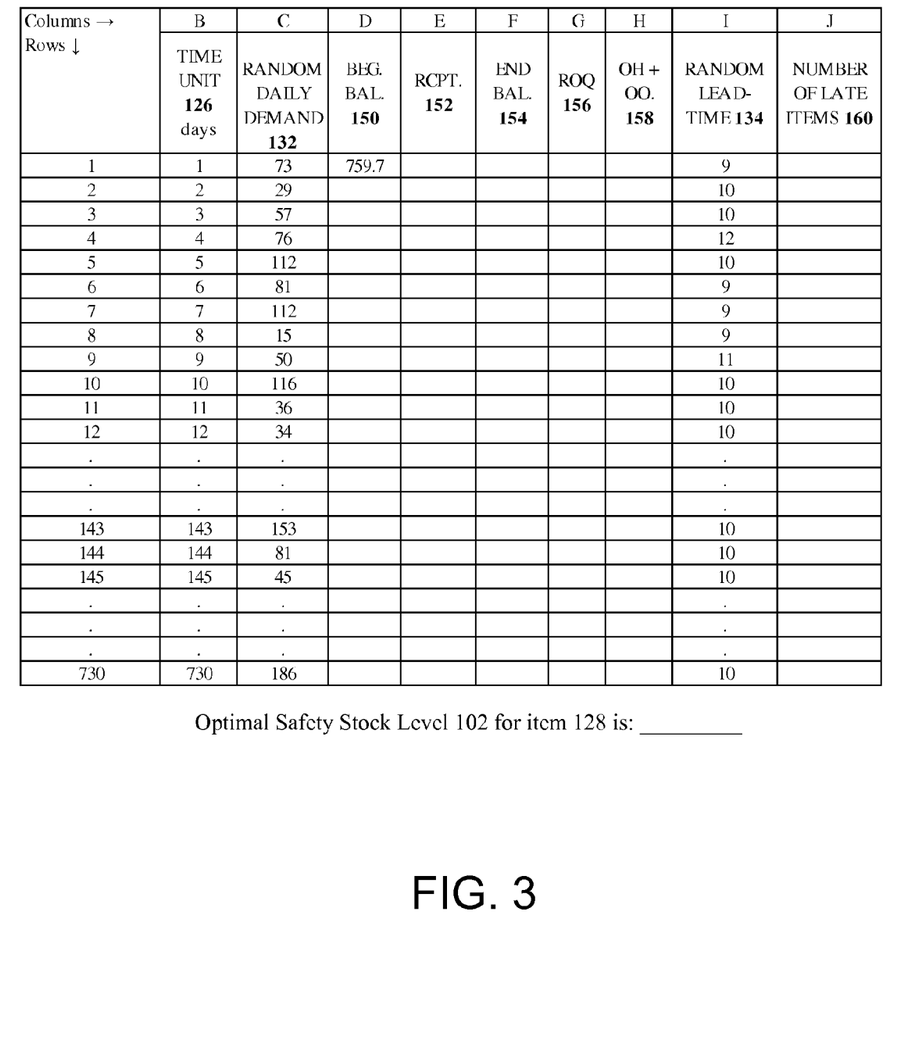
FIG. 3 shows another exemplary spreadsheet outlining some of the values generated by the system of FIG. 1(a) to estimate safety stock levels.

Attention is now directed to FIG. 3. As can be appreciated, Column C and Column I of FIG. 3 outline the random daily demand (132) for each item (128) and the random-lead-time (134) for each particular order respectively, as shown previously in FIG. 2. As can further be appreciated from (FIG. 3), the program (100) utilizes in its simulation a beginning balance (150) (BEG. BAL. (150) in FIG. 3, at Column D), a received quantity (152) (RCPT (152) in FIG. 3, at Column E), an ending balance (154) (END BAL (154) in FIG. 3, at Column F), a reorder quantity (156) (ROQ (156) in FIG. 3, at Column G), and an on-hand plus on-order quantity (158) (OH+OO (158) in FIG. 3, at Column H). Column J is designated for entry of number of late items (160).

The beginning balance (150) for a particular time unit (126) refers to the number of items (128) that the business has in its inventory at the start of business on that time unit (126). Initially, the beginning balance (150) for the first time unit (126) may be estimated, however, this beginning balance may be refined during subsequent steps to achieve the target service level (104) (as explained below). Consider that the beginning balance (150) on day 1 is estimated to be 759.7 (as shown in cell D1) by evaluating the actual inventory of the business. The beginning balance (150) for day 1 may also be referred to as the reorder point.

The ending balance (154) for a particular time unit (126) refers to the number of items (128) that the business has at closing on that time unit (126). Thus, for all time units (126) except the first time unit (126), the beginning balance (150) is the previous time unit's ending balance (154).

The reorder quantity (156) for a particular time unit (126) refers to the total number of items (128) for which orders were placed that day. Here, as each package of the item (128) contains twelve items (128), the value of the reorder quantity (156), where greater than zero, will be rounded up to the nearest multiple of twelve.

The received quantity (152) of a particular time unit refers to the number of items (128) that the business received on that day from an order made previously. The value of the received quantity for a particular time unit (126) will depend on the order's lead-time (134) (as explained in more detail below).

The on-hand plus on-order quantity (158) for a particular time unit (126) refers to that quantity of items (128) which the business has in stock, plus all the items (128) that have previously been ordered but which have not yet been received.

Figure 4:
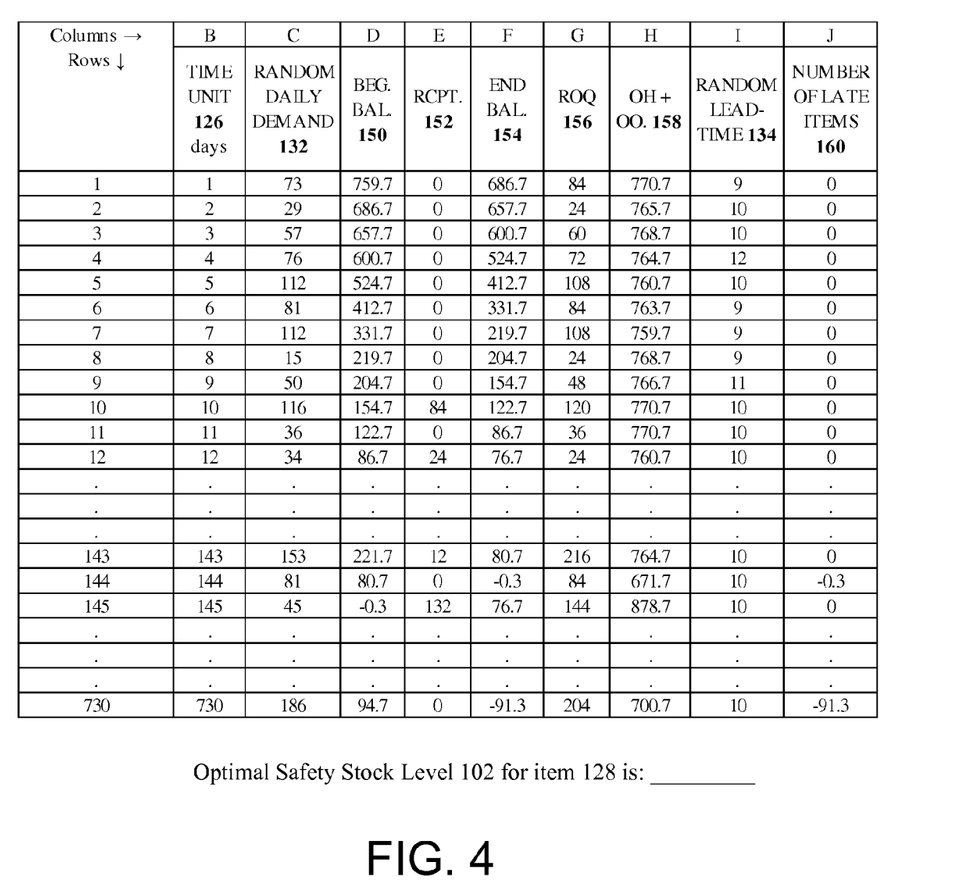
FIG. 4 shows yet another exemplary spreadsheet outlining some of the values generated by the system of FIG. 1(a) to approximate safety stock levels.

Attention is now directed to FIG. 4, to illustrate how the beginning balance (150), ending balance (154), reorder quantity (156), and on-hand plus on-order quantity (158) are populated for each time unit (126) by the program (100) by using the information shown in FIG. 3 (as shown in FIG. 3, this information comprises the random daily demand (132) for each day, the random lead-time (134) for each day, and the estimated beginning balance (150) for day 1).

Time Unit 1

The beginning balance (150) on day 1 (i.e., the reorder point) is estimated to be 759.7 (cell D1). The received quantity (152) on day 1 is zero, as no orders are received on day 1 (this is because the program (100) initiates the simulation on day 1, and in the received quantity (152) column, only accounts for those orders that are placed on day 1 or later).

The ending balance (154) is then calculated by using the following formula:

$$\text{Ending Balance } (154)_{day\ 1} = \text{Beginning Balance } (150)_{day\ 1} + \text{Received Quantity } (152)_{day\ 1} - \text{Demand } (132)_{day\ 1}.$$

Thus, the ending balance (154) on day 1 has a value of 686.7, as shown in Col. F1 (i.e., 759.7+0−73).

The program (100) then computes the reorder quantity (156) for day 1 by first subtracting the ending balance (154) of day 1 from the beginning balance (150) of day 1, which, for day 1, yields a value of 73, and then, rounding this value up to the closest multiple of 12. Thus, the reorder quantity (156) for day 1 is 84 (cell G1). The random lead-time (134), which has a value of 9 for day 1, indicates that this order of 84 items (128) will arrive at the business after 9 days (i.e., on day 10).

The on-hand+on-order quantity (158) for day 1 in cell H1 is calculated by adding the items (128) in stock at the end of day 1 (i.e., ending balance (154) of day 1) and the reorder quantity (156) of day 1, which yields a value of 770.7 (i.e. 686.7+84).

After values for the beginning balance (150), received quantity (152), ending balance (154), reorder quantity (156), and on-hand plus on-order quantity (158) for day 1 are computed, the program (100) moves on to day 2.

Time Unit 2

The beginning balance (150) of day 2 is the ending balance (154) of day 1, i.e., 686.7. The received quantity (152) for day 2 is zero, because no order has yet been received by the business. The ending balance (154) of day 2 is calculated by using the formula noted above, i.e.:

Ending Balance $(154)_{day\ 2}$=Beginning Balance $(150)_{day\ 2}$+Received Quantity $(152)_{day\ 2}$-Demand $(132)_{day\ 2}$.

For day 2, thus, the ending balance (154) is 657.7 (i.e., 686.7+0−29=657.7, as shown in cell F2.)

The reorder quantity (156) for time unit 2, and the remaining time units, is calculated by using the following formula:

Reorder quantity $(156)_{day\ n}$=Reorder point−[(On-hand+On order $(158))_{day\ n-1}$−Demand $(132)_{day\ n}]$.

As noted, if this reorder quantity (156) is not a multiple of 12, it is rounded up to the nearest multiple of 12. So, for day 2, the reorder quantity (156) is 24, i.e.:

Reorder quantity $(156)_{day\ 2}$=Reorder point−[(On-hand+On order $(158))_{day\ 1}$−Demand $(132)_{day\ 2}]$.

So, Reorder quantity $(156)_{day\ 2}$=759.7−[770.7−29]=18, rounded up to the nearest multiple of 12, equals 24.

The on-hand+on order quantity (158) for day 2, and the remaining time units (126), is calculated by using the following formula:

(On-hand plus On-order $(158))_{day\ n}$=Ending Balance $(154)_{day\ n}$+Σ Reorder Quantitites (156) not yet received, including reorder quantity of day n.

For day 2, thus, the on-hand plus on-order quantity (158) is calculated as follows:

(On-hand plus On-order $(158))_{day\ 2}$=Ending Balance $(154)_{day\ 2}$+Σ Reorder Quantitites (156) of day 2 and day 1.

So, the (On-hand plus On-order $(158))_{day\ 2}$=657.7+84+24=765.7, as outlined in cell H2.

Time Unit 3

Values for time unit 3 are then calculated by using the formulas listed above for time unit 2. Specifically, the beginning balance (150) for day 3 is the ending balance (154) for day 2, i.e., 657.7. The received quantity (152) is still zero, because the orders made on day 1 and day 2 have not yet been received by the business. The ending balance (154) is computed by adding the beginning balance (150) and received quantity (152) for day 3 and then subtracting the demand (132) for day 3, which yields a value of a 600.7.

The reorder quantity (156) for day 3 is calculated by using the formula listed above:

Reorder quantity $(156)_{day\ 3}$=Reorder point−[(On-hand+On order $(158))_{day\ 2}$−Demand $(132)_{day\ 3}]$.

As noted, if the reorder quantity (156) is not a multiple of 12, it is rounded up to the nearest multiple of 12. So, for day 3, the reorder quantity (156) is 60, as outlined in cell G3 (i.e., 759.7−[765.7−57]=51, rounded up to the nearest multiple of 12, equals 60).

The on-hand plus on-order quantity (158) for day 3 is similarly computed by using the formula listed above, i.e:

(On-hand plus On-order $(158))_{day\ 3}$=Ending Balance $(150)_{day\ 3}$+Σ Reorder Quantitites (156) from days 1, 2 and 3.

The on-hand plus on-order quantity (158) for day 3 thus has a value of 768.7 (i.e., 600.7+60+84+24), as outlined in cell H3.

Time Units 10, 11, and 12

To illustrate further, consider, for example, that the program (100) has computed, according to the formulae listed above, the beginning balance (150), the received quantity (152), the ending balance (154), the reorder quantity (156), and the on-hand plus on-order quantity (158) for the first nine time units (126). As will be appreciated, for the ninth time unit (126), the beginning balance (150) is 204.7 (cell D9), the received quantity (152) is zero (cell E9, as none of the orders placed previously have been received), the ending balance (154) is 154.7 (cell F9), the reorder quantity (156) is 48 (cell G9), and the on-hand plus on-order quantity (158) is 766.7 (cell H9).

The beginning balance (150) for the tenth time unit (126) will be the ending balance (154) of time unit 9, i.e, 154.7 (cell D10). The received quantity (152) for the tenth time unit (126) will be 84 (cell E10), as the 84 items (128) that were ordered on day 1 and which had a lead-time (134) of 9 days, are received by the business on day 10. The ending balance (154) on day 10 would thus be 122.7, as outlined in cell F10, i.e.:

Ending Balance $(154)_{day\ 10}$=Beginning Balance $(150)_{day\ 10}$+Received Quantity $(152)_{day\ 10}$-Demand $(132)_{day\ 10}$.

So, the ending balance $(154)_{day\ 10}$=154.7+84−116=122.7.

The reorder quantity (156) on day 10 will be 120, as outlined in cell G10, i.e.: Reorder quantity $(156)_{day\ 10}$=Reorder point−[(On-hand+On order $(158))_{day\ 9}$−Demand $(132)_{day\ 10}]$. So, Reorder quantity $(156)_{day\ 10}$=759.7−[766.7−116]=109, rounded up the nearest multiple of 12, equals 120.

The on-hand plus on-order quantity (158) on day 10 will be 770.7, as outlined in cell H10, calculated by the formula listed above, i.e.:

(On-hand+On order $(158))_{day\ 10}$=Ending Balance $(154)_{day\ 10}$+Σ Reorder Quantitites (156) from days 2, 3, 4, 5, 6, 7, 8, 9, 10.

So, (On-hand+On order $(158))_{day\ 10}$=122.7+(24+60+72+108+84+108+24+48+120)=770.7.

It will be appreciated that the reorder quantity (156) from day 1 (of 84 items (128)) is not included here when summing the reorder quantities (156) that have not yet been received, as this particular order is received on day 10.

The beginning balance (150) for day 11 will be the ending balance (154) of day 10, i.e., 122.7 (cell D11). The received quantity (152) for day 11 is zero (even though an order was placed on day 2, that order had a lead-time of 10 days, and as such, will arrive on day 12). Thus, the ending balance (154) on day 11 is 86.7 (cell F11, i.e., 122.7+0−36=86.7).

The reorder quantity (156) on day 11 will be 36, as outlined in cell G11, i.e.: Reorder quantity $(156)_{day\ 11}$=Reorder Point−[(On-hand+On-order $(158))_{day\ 10}$−Demand $(132)_{day\ 11}]$. So, Reorder quantity $(156)_{day\ 11}$=759.7−[770.7−36]=25, rounded up the nearest multiple of 12, equals 36.

The on-hand plus on-order quantity (158) on day 11 will be 770.7, as outlined in cell H11, i.e.:

(On-hand+On-order $(158))_{day\ 11}$=Ending Balance $(154)_{day\ 11}$+Σ Reorder Quantitites (156) from days 2, 3, 4, 5, 6, 7, 8, 9, 10, 11.

So, (On-hand+On-order $(158))_{day\ 11}$=86.7+(24+60+72+108+84+108+24+48+120+36)=770.7.

The beginning balance (150) for day 12 will be the ending balance (154) for day 11, i.e., 86.7. The received quantity (152) on day 12 will be 24 (cell E12) as the order of 24 items placed on day 2 has now arrived at the business. The ending balance (154) for day 12, thus, will be 76.7 (i.e., 86.7+24−34=76.7).

The reorder quantity (156) on day 12 will be 24, as outlined in cell G12, i.e.:

Reorder quantity $(156)_{day\ 12}$=Reorder Point−[(On-hand+On-order $(158))_{day\ 11}$−Demand $(132)_{day\ 12}$].

So, Reorder quantity $(156)_{day\ 12}$=759.7−[770.7−34]=23, rounded up the nearest multiple of 12, equals 24.

The on-hand plus on-order quantity (158) on day 12 will be 760.7, as outlined in cell H12, i.e.:

(On-hand+On-order $(158))_{day\ 12}$=Ending Balance $(154)_{day\ 12}$+Σ Reorder Quantitites (156) from days 3, 4, 5, 6, 7, 8, 9, 10, 11, 12.

So, (On-hand+On-order $(156))_{day\ 12}$=76.7+ [60+72+108+84+108+24+48+120+36+24]=760.7.

Number of Late Items (160) (Column J)

For some time units, the sum of the beginning balance (150) and the received quantity (152) will be less than the random demand (132). For these time units (126), the ending balance (154) will have a value that is less than zero, and these ending balances (154) are outlined in Column J as the number of late items (160). As can be seen, none of the first twelve time units (126) have a non-zero value in Column J, because, for all these days, the ending balance (160) is greater than zero.

Consider now the 144th time unit (126), where beginning balance (150) is equal to the ending balance (154) on day 143 (i.e., 80.7, cell D144). The received quantity (152) on day 144 is zero because no orders made previously arrived on day 144. The random demand (132) on day 144 is 81 (cell C144). Thus, the ending balance (154) of day 144 is −0.3 as outlined in cell F144, i.e.:

Ending Balance $(154)_{day\ 144}$=Beginning Balance $(150)_{day\ 144}$ Received Quantity $(152)_{day\ 144}$− Demand $(132)_{day\ 144}$.

So, Ending Balance $(154)_{day\ 144}$=80.7+0−81=−0.3.

This ending balance (154), because it is less than zero, will be listed in cell J144 as the number of late items (160). It will be appreciated that in the program (100), several time units (126) within the 730 time units (126) may have an ending balance (154) that is less than zero.

Calculation of the Customer Service Level

The program (100), as discussed above, computes the values for the beginning balance (150), ending balance (154), received quantity (152), reorder quantity (156), on-hand plus on-order quantity (158), and the number of late items (160) for each of the 730 time units (126). Once these values have been computed, the program (100) calculates the customer service level as follows.

First, the number of late items (160) for each of the 720 time units (126), excluding the first 10 time units (126) for the initial 10-day lead-time cycle, are added (i.e., all the negative ending balances listed in Column J for the 720 time units (126) are added). People of skill in the art will appreciate that the first ten time units (126) are excluded because, in this example, they represent an initial lead-time cycle (i.e., a cold start), whereas the remaining time units (126) (i.e., the final 720 days) represent the steady state. People of skill in the art will further appreciate that the actual number of time units (126) to be excluded in a given scenario will be determined by the specific data. The sum of the number of late items (160) for the 720 time units (126) yields a negative value, as each ending balance (154) being added also has a value that is less than zero. Assume that this sum yields a value of −2975.8.

Now, the random demands (132) for each of the 720 time units (126), excluding the first 10 time units (126) for the initial 10-day lead-time cycle, are added (i.e., all the random daily demands (126) listed in Column C are added, except for the first 10 days). Assume that this sum yields a value of 44003.

Next, the sum of the number of late items (160) for the 720 days is divided by the sum of the random demands (132) for the 720 days. This yields a value of −0.0672 (i.e., −2975.8/ 44003=−0.0672)

The number 1 is now added to this value, and the result is then multiplied by the number 100 to provide the customer service level. In this example, then, the customer service level is 93.28% (i.e., 1+(−0.0672)=0.9328; 100*0.9328=93.28%)

This customer service level can be expressed formulaically as:

{1+[Σ number of late items (160) in 720 days/Σ daily demands (132) for 720 days]}*100.

As noted, the sum of number of late items (160) for the 720 days will yield a negative value because, the number of late items (160) for each time unit (126), as defined herein, has a value that is less than zero.

After having computed the service level, which in this example has a value of 93.28%, the program (100) compares the computed service level to the target service level (104). The target service level (104) for the business in this example is 90%. Thus, the computed service level over the 720 day period is greater than the target service level (104). While maintaining a higher service level of 93.28% may not be undesirable in itself, people of skill in the art will appreciate that a larger safety stock (102) may be needed to maintain this higher service level, and that maintenance of this larger safety stock (102) may be undesirable. The program (100), hence, refines the reorder point (i.e., increases or decreases the estimated beginning balance (150) for day 1), which initially was estimated to be 759.7, and recalculates the beginning balances (150), ending balances (154), received quantities (152), reorder quantities (156), on-hand plus on-order quantities (158), and the number of late items (160) for each of the 730 days based on the refined reorder point. Once all these values are computed, the program (100) recalculates the customer service level as discussed above and compares it to the target customer service level (104) of 90%. If the computed service level is still not equal (or approximately equal) to the target customer service (102), the program (100) refines the reorder point yet again, and continues to iterate the reorder point until the computed service level is equal (or approximately equal) to the target service level (104) of 90%.

Assume, for example, that after iterating the reorder point several times, the program (100) determines that a reorder point of 753.69 items (128) yields a service level of 90.3%, which is approximately equal to the target service level (102) of 90%. The program (100) then determines the safety stock level (102) that must be maintained to meet this service level as follows.

First, the program (100) calculates the mean random demand per time unit. The mean random demand per time unit may be calculated by adding the values in Column C for all the time units (126) excluding the first ten time units (126), and then dividing this sum by 720, i.e.:

Mean Demand=Σ random demands (132) for each of the 720 days/720 days.

Assume that the sum of demands (132) for each of the 720 days equals 44003.0. The mean demand, thus, is 61.12 items per day (i.e., 44003/720=61.12).

The program (100) then calculates the mean reorder quantity by adding the reorder quantities for the 720 time units (126) (as outlined in Column G), and dividing it by the total number of days for which this reorder quantity (156) was non-zero. Assume that the sum of the reorder quantities (156) for all the 720 days equals 44004.00, and that 156 days out of the 720 days had a reorder quantity (156) of zero (i.e., no order was made on these 156 days). The mean reorder quantity, thus, is 78.02 (i.e., 44004/(720−156)=78.02).

The program (100) then divides the mean reorder quantity by the mean demand to obtain a mean replenishment period. In this example, then, the mean replenishment period is 1.27 (i.e., 78.02/61.12=1.27).

The safety stock level (102) is then calculated by using the following formula:

Safety Stock Level (102)=Reorder Point yielding the target service level (104)−(Mean Demand*Mean Lead-Time).

The safety stock level (102), in this example, is thus 143 items 128 (i.e., 753.69−(61.12*10)=142.5, or 143).

In this way, the program (100) estimates that if the business has about 754 items (128) on day 1 and wishes not to expedite any items (128), that based on the various information provided or estimated (e.g., the random daily demand values (132), the random daily lead-time values (134), the probability of cancellation (120), et cetera), the business should maintain a safety stock level (102) of 143 items (128) throughout the next two years to maintain its target service level (104) of 90%.

The system (10) may then repeat the steps above a number of times. For each repetition, the system (10) may generate the random daily demands (132) and random lead times (134) for the item (128), so as to obtain a statistically reliable range of estimated outcomes for the safety stock level (102). Using this range of outcomes, the system (10) may statistically determine the safety stock level (102) that provides the target probability of demand fulfillment without expediting (122) (90% in this example). For example, the system (10) may determine that a safety stock level (102) of 140 items (128) needs to be maintained by the business to achieve a desired service level (104) of 90% with a 90% confidence of doing so without expediting.

The system (10) may also refine other values used in the program (100). For example, the system (10) may have program (100) recalculate the safety stock level (102) after refining the values of the probability of cancellation (120), the target customer service level (104), the probability of demand fulfillment without expediting (122), et cetera, to provide the business with a range of possibilities. The business may also use the system (10) to estimate other values that were not specifically referenced above, for example, an average ending balance for the item (128) or the average number of items (128) received in a day. The business may use the results from the various iterations for risk assessment, best case scenario assessment, worst case scenario assessment, et cetera.

People of skill in the art will appreciate that while the system (10) and program (100) have been illustrated here by using one exemplary scenario, that the system (10) and the program (100) may similarly be used to estimate the optimal safety stock levels (102) in other situations (e.g., to estimate a safety stock level (102) for a business over the course of the next six months for maintenance of a target customer service level (104) of 99% with 95% confidence of doing so without expediting).

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A software product comprising instructions, stored on non-transitory computer-readable media, wherein the instructions, when executed by a computer, perform steps to determine safety stock levels to be maintained by a business during a time period, comprising:
    a) receiving as an input:
        (i) a target customer service level for the business;
        (ii) the time period;
        (iii) a probability of cancellation for the item;
        (iv) actual historical time-series demand data for the item;
        (v) actual historical time-series lead-time data for the item;
        (vi) a minimum order quantity;
    b) decomposing the actual historical time-series demand data for the item to isolate a component attributable at least predominantly to a random variation in a demand for the item;
    c) using an array of statistical distributions to generate a random demand for the item for each of a plurality of time units within the time period and for each time unit within a mean lead-time for the item;
    d) decomposing the actual historical time-series lead-time data for the item to isolate a component attributable at least predominantly to a random variation in a lead-time for the item;
    e) using the array of statistical distributions to generate a random lead-time for the item for each of the plurality of time units within the time period and for each time unit within the mean lead-time for the item;
    f) estimating a first value for a reorder point to compute a first calculated service level, said reorder point reflecting a beginning balance for the item on a first time unit;
    g) estimating a second value for the reorder point to compute a second calculated service level; and
    h) estimating a third value for the reorder point to compute a third calculated service level;
    wherein a difference between the target service level and the third calculated service level is less than a difference between the target service level and the first calculated service level;
    wherein the difference between the target service level and the third calculated service level is less than a difference between the target service level and the second calculated service level.

2. The software product of claim 1, wherein the array of statistical distributions comprises at least one of: a Poisson distribution, a gamma distribution, a gamma-Poisson distribution, a binomial distribution, and a binomial gamma distribution.

3. The software product of claim 2, wherein the array of statistical distributions further comprises a normal distribution.

4. The software product of claim 3 further comprising the steps of:
computing a beginning balance, an ending balance, a received quantity, an on-hand and on-order quantity, a reorder quantity, and a number of late items for each of the plurality of time units within the time period and for each time unit within the mean lead-time for the item by using the first value for the reorder point;
computing the beginning balance, the ending balance, the received quantity, the on-hand and on-order quantity, the reorder quantity, and the number of late items for each of the plurality of time units within the time period and for each time unit within the mean lead-time for the item by using the second value for the reorder point; and
computing the beginning balance, the ending balance, the received quantity, the on-hand and on-order quantity, the reorder quantity, and the number of late items for each of the plurality of time units within the time period and for each time unit within the mean lead-time for the item by using the third value for the reorder point.

5. The software product of claim 4 wherein the beginning balance for any particular time unit except the first time unit is equal to the ending balance for a time unit immediately preceding the particular time unit.

6. The software product of claim 5 wherein the ending balance for a specified time unit is equal to the random demand for the specified time unit subtracted from the sum of the beginning balance and the received quantity for the specified time unit.

7. The software product of claim 6 wherein the reorder quantity for a given time unit is computed by:
   a) calculating a first intermediate value by subtracting the random demand for the given time unit from the on-hand and on-order quantity of a time unit immediately preceding the given time unit;
   b) calculating a second intermediate value by subtracting the first intermediate value from the beginning balance for the first time unit; and
   c) rounding the second intermediate value up to a nearest multiple of the minimum order quantity.

8. The software product of claim 7 wherein the on-hand plus on-order quantity for a certain time unit is computed by adding the ending balance for the certain time unit and the reorder quantities that have been ordered but which have not yet been received by the certain time unit.

9. The software product of claim 8, wherein the first calculated service level is computed by:
   a) calculating a third intermediate value by adding the number of late items for each of the plurality of time units within the time period;
   b) calculating a fourth intermediate value by adding the random demands for each of the plurality of time units within the time period;
   c) calculating a fifth intermediate value by dividing the third intermediate value by the fourth intermediate value;
   d) calculating a sixth intermediate value by adding one to the fifth intermediate value; and
   e) multiplying the sixth intermediate value by one hundred.

10. The software product of claim 9, further comprising the steps of:
receiving as an input a target probability of demand fulfillment without expediting;
regenerating a plurality of times the random demand for the item for each of the plurality of time units within the time period and for each time unit within a mean lead-time for the item;
regenerating a plurality of times the random lead-time for the item for each of plurality of time units within the time period and for each time unit within a lead-time for the item;
statistically determining the safety stock level that satisfies the target probability of demand fulfillment without expediting.

11. A software product comprising instructions, stored on non-transitory computer-readable media, wherein the instructions, when executed by a computer, perform steps to determine safety stock levels to be maintained by a business during a time period, comprising:
   a) receiving as an input:
      (i) a target customer service level for the business;
      (ii) the time period; and
      (iii) a probability of cancellation for the item;
   b) decomposing actual historical time-series demand data for the item to isolate a component attributable primarily to a random variation in a demand for the item;
   c) using at least one distribution in an array of statistical distributions to generate a random demand for the item for each of a plurality of time units within the time period and for each time unit within a mean lead-time for the item;
   d) decomposing actual historical time-series lead-time data for the item to isolate a component attributable primarily to a random variation in a lead-time for the item;
   e) using at least one distribution in an array of statistical distributions to generate a random lead-time for the item for each of the plurality of time units within the time period and for each time unit within the mean lead-time for the item;
   f) estimating a first value for a reorder point to compute a first calculated service level, said reorder point reflecting a beginning balance of the item on a first time unit; and
   g) estimating a second value for the reorder point to compute a second calculated service level;
   wherein a difference between the target service level and the second calculated service level is less than a difference between the target service level and the first calculated service level;
   wherein the array of statistical distributions comprises a Poisson distribution, a gamma distribution, a binomial distribution, a gamma-Poisson distribution, and a binomial gamma distribution.

12. The software product of claim 11, wherein the instructions for determining safety stock levels include instructions for computing a beginning balance, an ending balance, a received quantity, an on-hand and on-order quantity, a reorder quantity, and a number of late items for each of the plurality of time units within the time period and for each time unit within the mean lead-time for the item by using: (a) the first value for the reorder point; and (b) the second value for the reorder point.

13. The software product of claim 12, wherein:
the beginning balance for any particular time unit except the first time unit is equal to the ending balance for a time unit immediately preceding the particular time unit; and
the ending balance for a specified time unit is equal to the random demand for specified time unit subtracted from the sum of the beginning balance and the received quantity for the specified time unit.

14. The software product of claim 13, wherein the reorder quantity for a given time unit except the first time unit is computed by:
 a) calculating a first intermediate value by subtracting the random demand for the given time unit from the on-hand and on-order quantity of a time unit immediately preceding the given time unit;
 b) calculating a second intermediate value by subtracting the first intermediate value from the beginning balance for the first time unit; and
 c) rounding the second intermediate value up to a nearest multiple of a minimum order quantity.

15. The software product of claim 14, wherein the on-hand plus on-order quantity for a certain time unit is computed by adding the ending balance for the certain time unit and the reorder quantities that have been ordered but which have not yet been received by the certain time unit.

16. The software product of claim 15, wherein the second calculated service level is computed by:
 a) calculating a third intermediate value by adding the number of late items for each of the plurality of time units within the time period;
 b) calculating a fourth intermediate value by adding the random demands for each of the plurality of time units within the time period;
 c) calculating a fifth intermediate value by dividing the third intermediate value by the fourth intermediate value;
 d) calculating a sixth intermediate value by adding one to the fifth intermediate value; and
 e) multiplying the sixth intermediate value by one hundred.

17. The software product of claim 16, wherein a mean replenishment period is calculated by dividing a mean reorder quantity by a mean demand.

18. The software product of claim 17, wherein the safety stock level is computed by:
 a) calculating a seventh intermediate value by multiplying the mean demand by the mean lead-time; and
 b) subtracting from the second value of the reorder point the seventh intermediate value.

19. A system for determining safety stock levels, the system comprising:
 at least one processor; and
 computer memory coupled to the processor and having recorded within it machine readable instructions for:
  a) receiving as an input:
   (i) a target customer service level for the business;
   (ii) the time period;
   (iii) a probability of cancellation for the item;
   (iv) actual historical time-series demand data for the item;
   (v) actual historical time-series lead-time data for the item;
   (vi) a target probability of demand fulfillment without expediting;
  b) decomposing the actual historical time-series demand data for the item to isolate a component attributable at least predominantly to a random variation in a demand for the item;
  c) using at least one of a plurality of statistical distributions to generate a random demand for the item for each of a plurality of time units within the time period and for each time unit within a lead-time for the item;
  d) decomposing the actual historical time-series lead-time data for the item to isolate a component attributable at least predominantly to a random variation in a lead-time for the item;
  e) using at least one of a plurality of statistical distributions to generate a random lead-time for the item for each of the plurality of time units within the time period and for each time unit within the mean lead-time for the item;
  f) iterating a value of a reorder point until it yields a calculated service level that is generally equal to the target customer service level, said reorder point reflecting a beginning balance of the item on first time unit;
  g) regenerating the random demand for the item for each of the plurality of time units within the time period and for each time unit within a mean lead-time for the item;
  h) regenerating the random lead-time for the item for each of the plurality of time units within the time period and for each time unit within a mean lead-time for the item;
 wherein the plurality of statistical distributions comprise a Poisson distribution, a gamma distribution, a binomial distribution, a binomial gamma distribution, a gamma Poisson distribution, and a normal distribution;
 wherein the statistical distribution used to generate the random demand for each of the plurality of time units is different from the statistical distribution used to generate the random lead-time for each of the plurality of time units.

20. The system of claim 19 wherein a beginning balance, an ending balance, a received quantity, an on-hand and on-order quantity, a reorder quantity, and a number of late items is computed for each of the plurality of time units within the time period and for each time unit within the mean lead-time for the item.

* * * * *